(No Model.) 3 Sheets—Sheet 1.
P. SCHAAR.
PRESSURE REGULATOR FOR FERMENTING VATS.
No. 316,491. Patented Apr. 28, 1885.
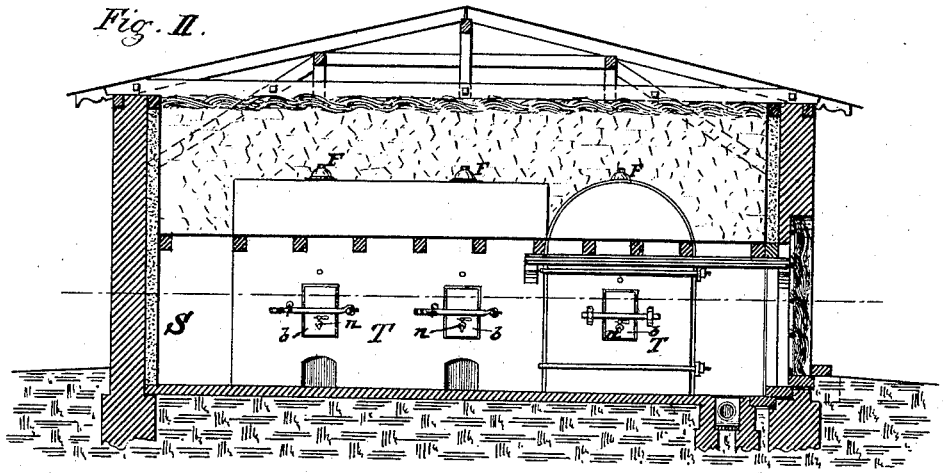
Fig. II.
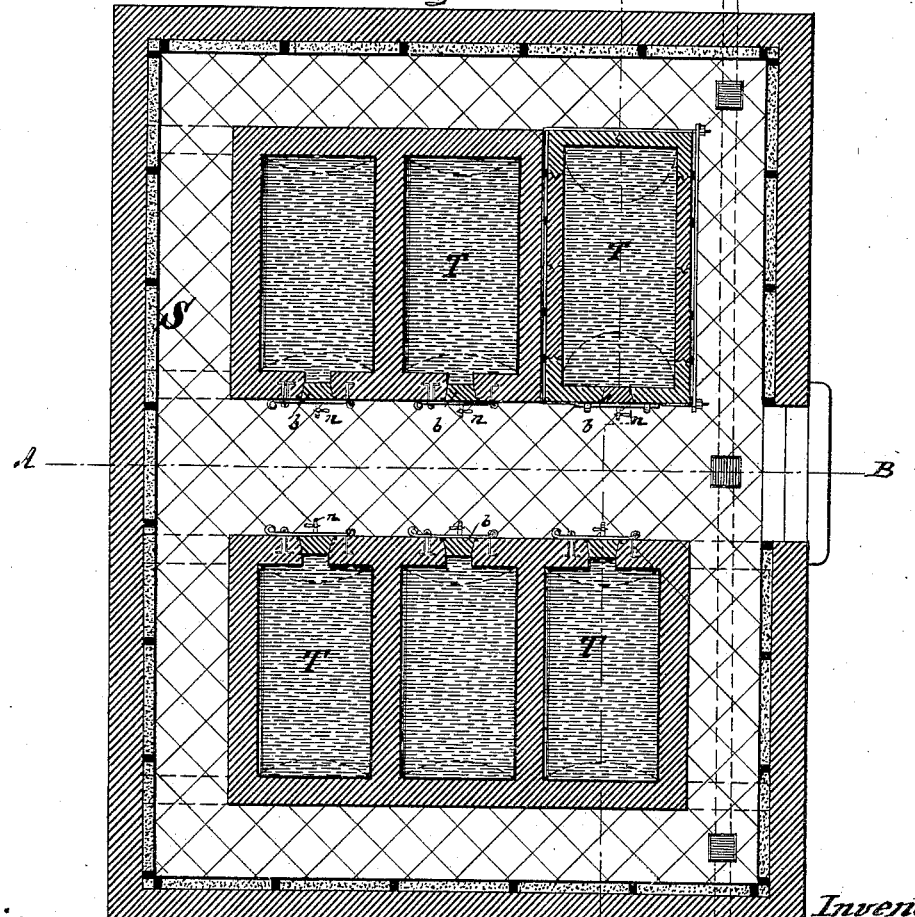
Fig. I.
Witnesses.
Inventor.
Paul Schaar (No Model.) 3 Sheets—Sheet 2.
P. SCHAAR.
PRESSURE REGULATOR FOR FERMENTING VATS.
No. 316,491. Patented Apr. 28, 1885.
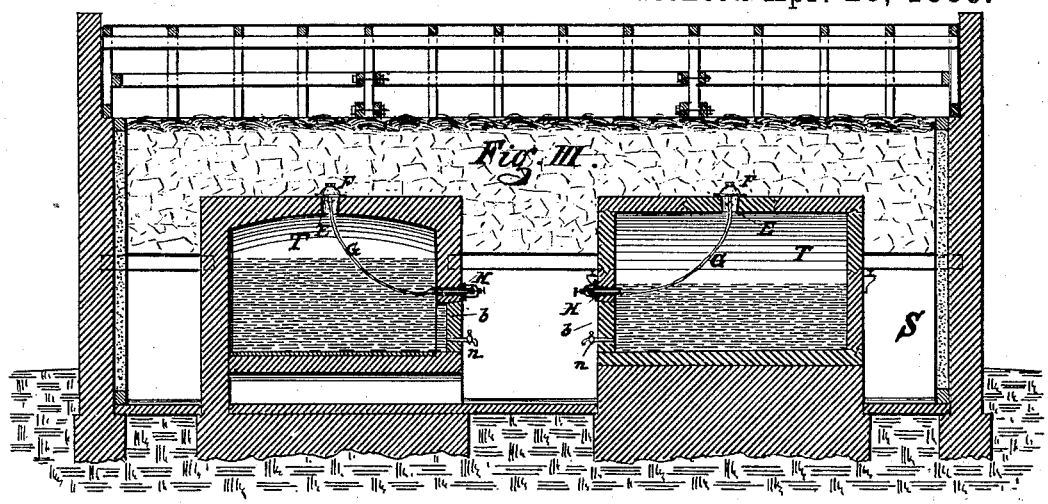
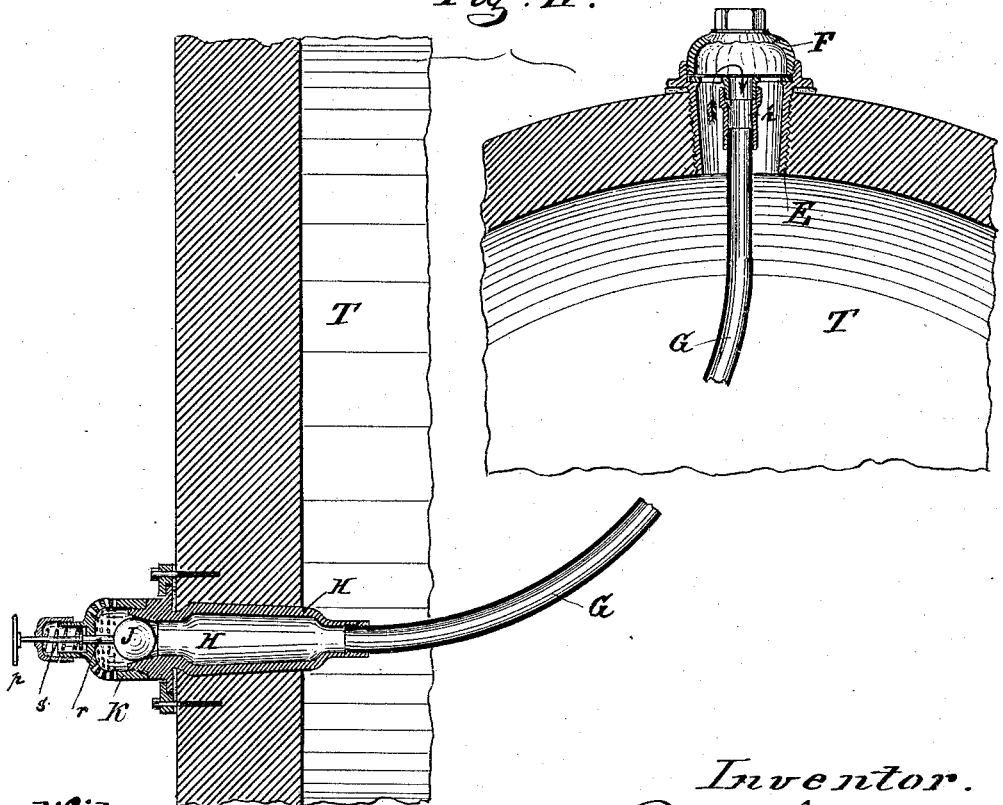

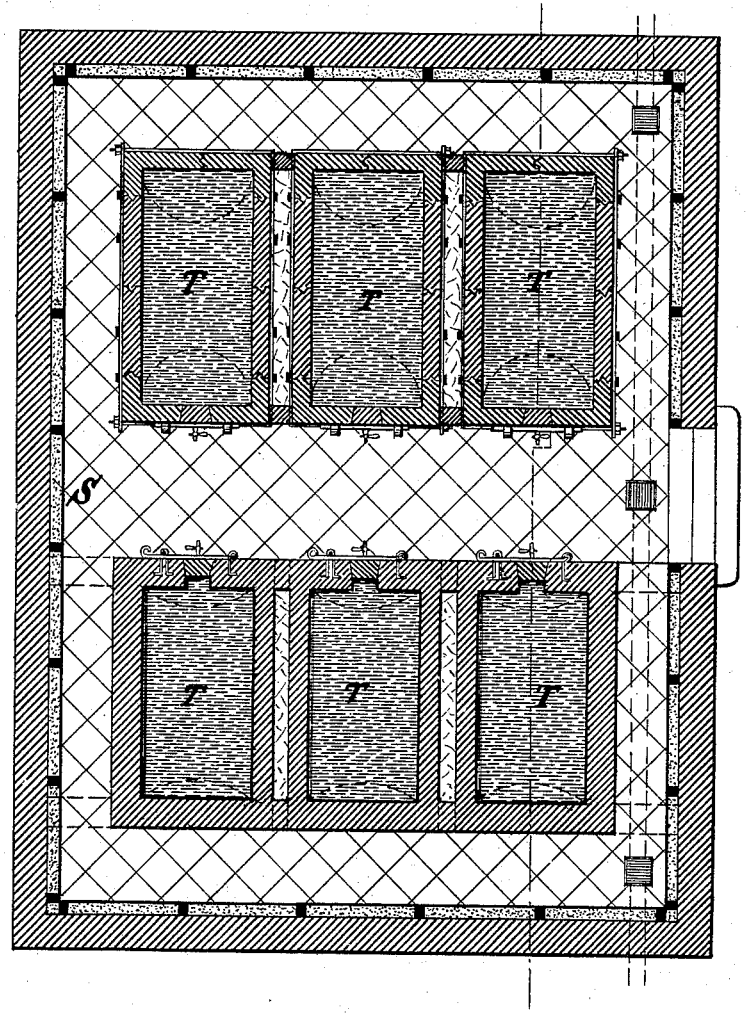

UNITED STATES PATENT OFFICE.

PAUL SCHAAR, OF POESSNECK, SACHSEN-MEININGEN, GERMANY.

PRESSURE-REGULATOR FOR FERMENTING-VATS.

SPECIFICATION forming part of Letters Patent No. 316,491, dated April 28, 1885.

Application filed August 13, 1884. (No model.)

*To all whom it may concern:*

Be it known that I, PAUL SCHAAR, a citizen of Germany, residing at Poessneck, Sachsen-Meiningen, in the Empire of Germany, have invented a new and useful Improvement in Pressure-Regulators for Fermenting-Vats, of which the following is a specification.

In the usual arrangement of reservoirs, tubs, or vats for beer, which require to be surrounded by ice for cooling purposes, provision has to be made for easy access to the bung-holes to allow the necessary escape of gas and other matter during fermentation, and more particularly during second fermentation. By this arrangement the ice-covering has to be more or less disturbed, and which results often in serious consequence.

To arrange reservoirs, tubs, or vats for beer which can always be completely insulated and covered with ice and allow the required access to the bung-hole or its equivalent at all times without disturbing the ice forms the nature of my invention, Figure I shows a plan of a chamber with several reservoirs or vats arranged. Fig. II is a cross-section of the same at line A B, Fig. I. Fig. III is a cross-section at line C D, Fig. I. Fig. IV shows the arrangement of the bung at an enlarged size. Fig. V represents a plan similar to Fig. I with some modifications.

Similar letters represent similar parts in all the figures.

T are the reservoirs, tubs, or vats to receive the beer, arranged side by side and in regular rows in a suitable chamber or building, S. These vats I prefer to make of mason-work, stone, or glass, of the desired size and shape, and lined with a suitable cement.

The vats T are arranged side by side and in regular rows to give admission to their front part, as shown in Fig. I, or the vats may be separated some distance from each other, as shown in Fig. V, to allow ice being placed at their sides. In the lower part of these reservoirs or vats, at their front face, suitable doors or man-holes, b, are arranged, into which the cocks n for drawing off the beer are attached.

In the upper part of each reservoir or vat T an opening is made, forming the equivalent of the bung-hole, into which a hollow plug, E, is securely fastened, closed by a screw-cap, F. (See Fig. IV.) In the central part of this plug E a tube, h, is arranged, to which an india-rubber or flexible tube, G, is attached, the other end of which is attached to a hollow plug, H, fastened in the front part of the reservoir or vat. (See Fig. III.)

The outer end of the plug H is surrounded with a perforated cap, K, and the mouth of said plug is closed by a suitable valve, J, the stem r of which passes through the cap K and is acted upon by a spiral spring, s, acting to keep the valve J closed. By means of a handle or wheel, p, at the end of the spindle or stem r the valve may be regulated.

By this arrangement the escape of gases may be regulated without access being necessary to the bung-hole and without disturbing the layer of ice covering the top of the reservoir or vat T, and at the same time the desired pressure under which the second fermentation is to be carried on can easily be regulated by the regulation of the valve J.

I claim as my invention—

In combination with a reservoir or vat T, constructed substantially as described, the bung-hole plug E, screw-cap F, tube G, plug H, with perforated cap K, valve J, stem r, and spring s, arranged to operate substantially in the manner and for the purpose set forth.

In testimony whereof I have signed my name to this specification in the presence of two subscribing witnesses.

PAUL SCHAAR.

Witnesses:
EDMUND BACH,
OSWALD SCHMIDT.